United States Patent
Bowen

[11] 3,834,772
[45] Sept. 10, 1974

[54] FRACTURED BEARING RACE
[75] Inventor: Willard L. Bowen, Harwinton, Conn.
[73] Assignee: The Torrington Company, Torrington, Conn.
[22] Filed: June 8, 1972
[21] Appl. No.: 260,838

[52] U.S. Cl. ............................................. 308/196
[51] Int. Cl. .......................................... F16c 33/00
[58] Field of Search ........................... 308/196, 216

[56] References Cited
UNITED STATES PATENTS
2,624,645  1/1953  Virtue ............................... 308/216

Primary Examiner—Charles J. Myhre
Assistant Examiner—Frank Susko
Attorney, Agent, or Firm—David W. Tibbott et al.

[57] ABSTRACT

This is a new bearing race formed by fracturing the bearing by applying a concentrated force at a plurality of longitudinally spaced apart points on the bearing race.

Preferably, three pressure applying members are used in the system to make the fractured race. One pressure applying member is located adjacent each longitudinal end of the bearing race to be fractured. The third pressure applying member is circumferentially spaced from the other two pressure applying members.

14 Claims, 7 Drawing Figures

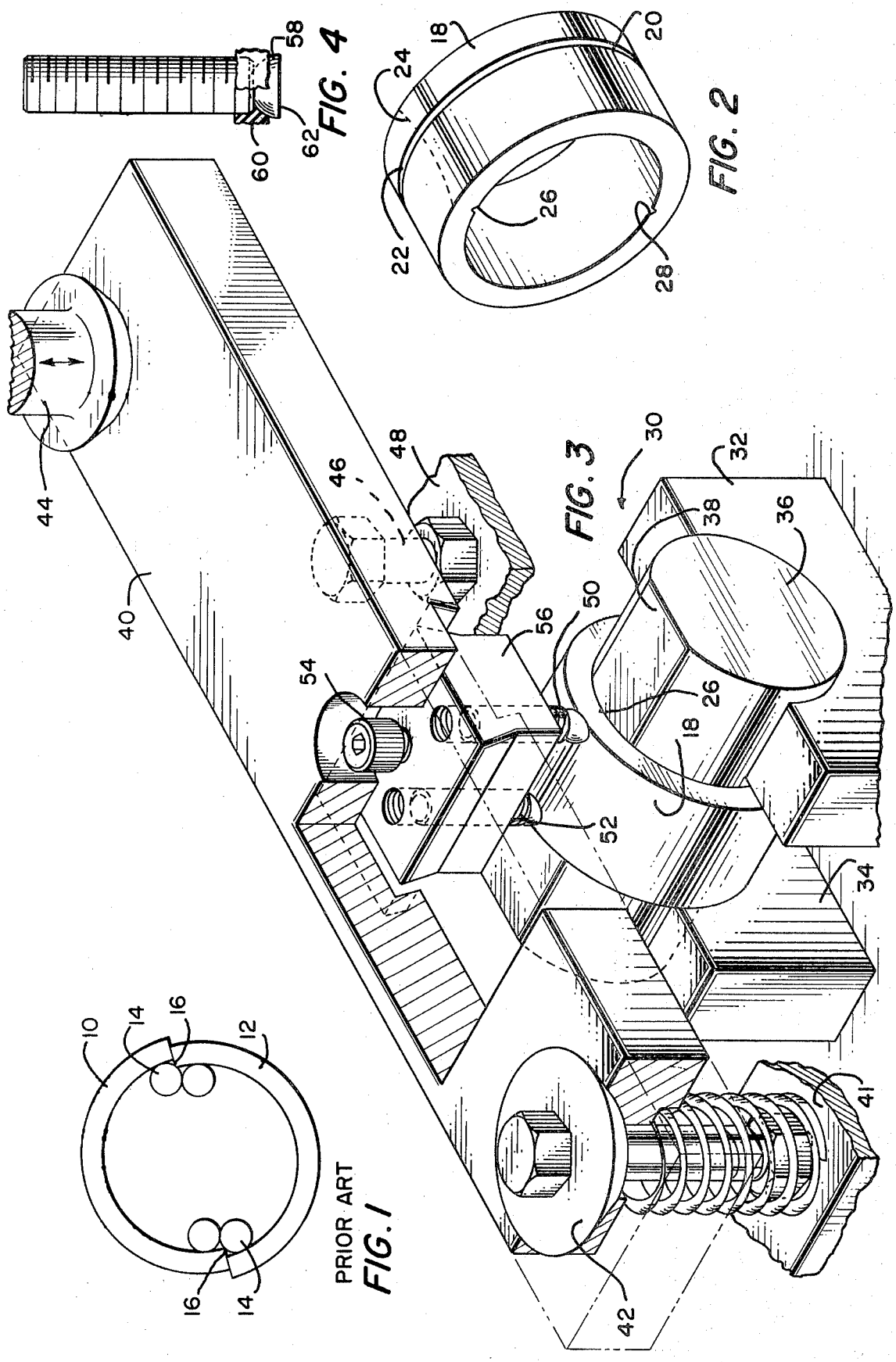

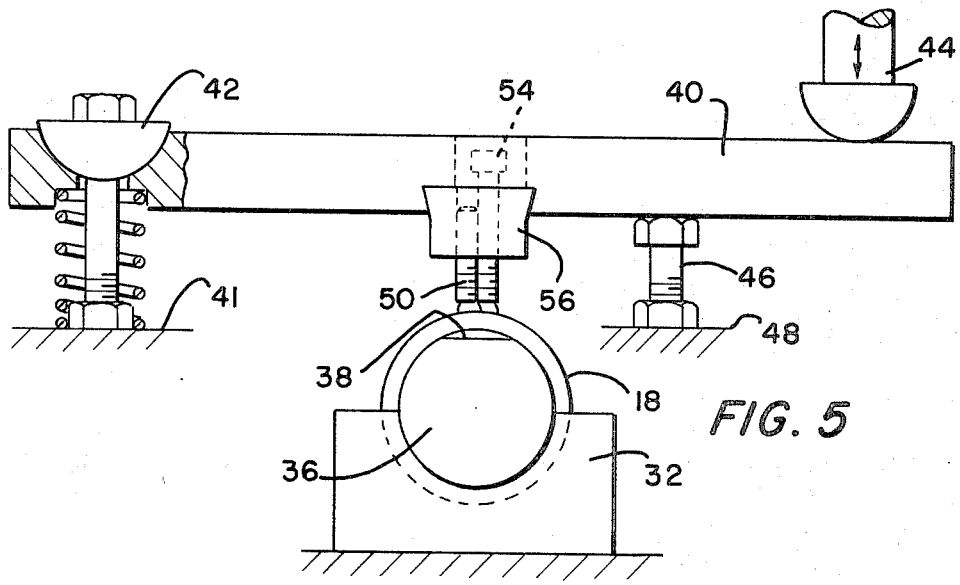
FIG. 5
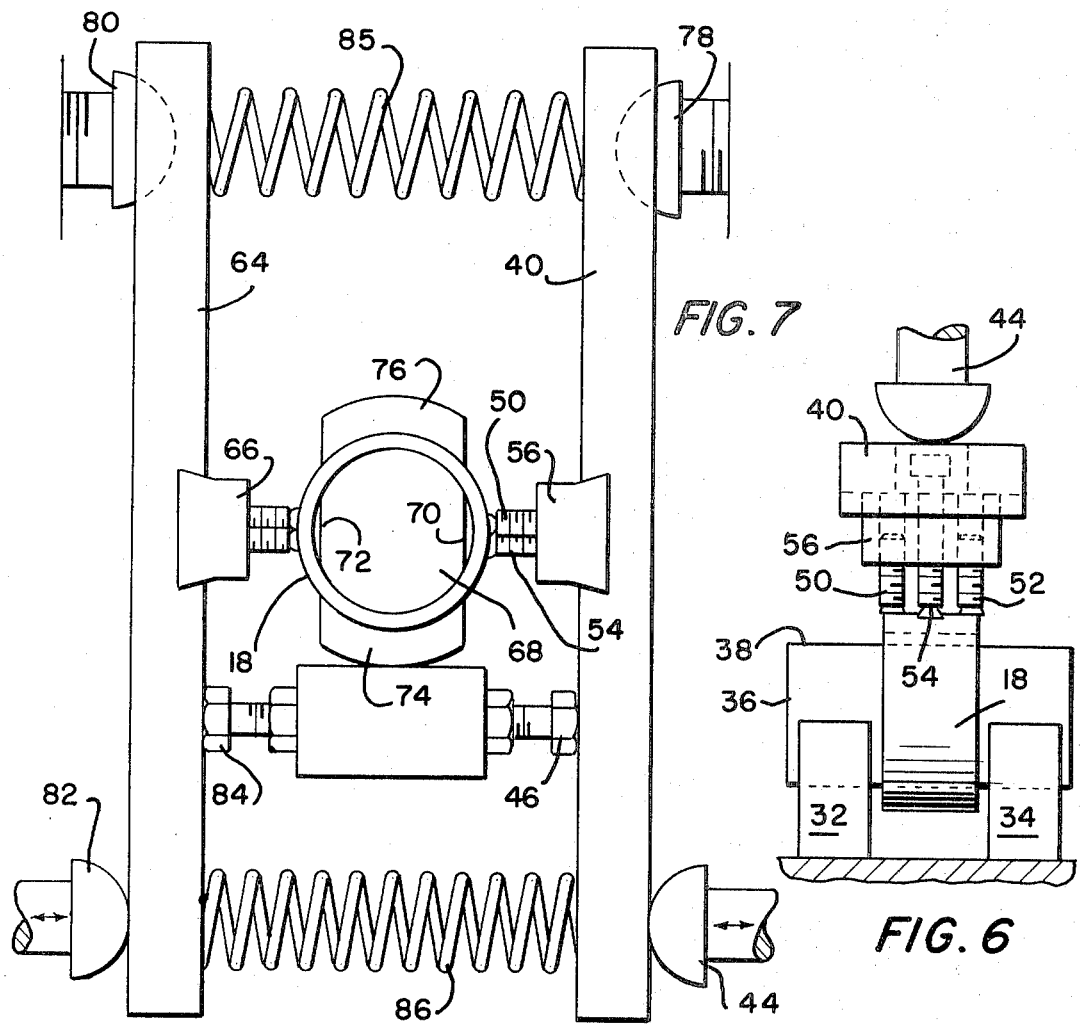
FIG. 7
FIG. 6

FRACTURED BEARING RACE

This invention relates to bearings. More particularly, this invention is a new and novel method and system for fracturing a bearing race and a new and novel fractured bearing race.

Fractured bearing races are commonly used for bearing applications where the whole bearing cannot be slipped onto a shaft. An example is a bearing applied to the center position of a crank shaft of an outboard motor.

A currently used method of fracturing a bearing race is to make a notch at each longitudinal end of the bearing race and provide a large hole at approximately the longitudinal center of the race. The notches and the hole are used to weaken the race at designated points and direct the fracture. Such currently utilized fracturing methods are exemplified by U. S. Pat. No. 2,624,105, issued Jan. 6, 1953 to B. T. Virtue entitled "Method of Preparing and Assembling Anti-Friction Bearings" and U. S. Pat. No. 2,624,645, issued Jan. 6, 1953 to B. T. Virtue entitled "Fractured Outer Race for Anti-Friction Bearings".

Of course, in producing bearing races in very large quantities, substantial time is used to indent a notch at each longitudinal end of the bearing race. Another step is required to form the holes in order to weaken the race to make the fracture proceed along a pre-determined path along the race.

My new method of producing a new and novel fractured race eliminates the formerly required step of forming a hole in the race and eliminates the need for at least one of the indented notches which were formerly required. This, of course, is a terrific cost saving.

Also, it was found that by utilizing my new method and system for fracturing a bearing race, there is a substantial reduction in scrap caused by poor fractures. In other used methods of fracturing, the fracture is often very straight and smooth because of the fine grain structure of the race material and mating surfaces do not match together well and cause a slight ridge or bump when assembled into the housing. Thus, the rollers contained in the finished bearing will bump over ridges in the race thus causing what is called "whistling". A "whistler" or noisy bearing is not acceptable in an engine assembly and the bearing will be considered defective.

With my new method and system a new bearing race is produced which provides excellent mating of the fractured portions. This is done by the use of longitudinally spaced apart pressure points on the outer surface of the unitary bearing race so as to control the direction and position of the fracture in such a way as to provide excellent mating surfaces which match together easily and prevent the mismatch "bump".

Briefly described, my new and novel bearing race comprises at least two sections having mating surfaces formed by fracturing a bearing by applying a concentrated force at each of a plurality of longitudinally spaced apart points on the bearing race. The race is provided with a circumferential groove and a split ring located in the groove to keep the sections of the race in axial alignment and in mating contact.

Briefly, my new method of fracturing a unitary bearing race comprises the step of applying a force at a plurality of spaced longitudinal points on the outer circumference of the bearing race.

The system for fracturing the unitary race member comprises a means for holding and supporting the race member, and means for applying forces at the plurality of spaced apart longitudinal points.

The invention as well as its many advantages may be further understood by reference to the following detailed description and drawings in which:

FIG. 1 is a schematic illustration showing the causes of "whistling" in the prior art;

FIG. 2 is a perspective view of my new fractured bearing race;

FIG. 3 is a perspective view, partly in section, showing my new system for producing the fracture;

FIG. 4 is an enlarged view, partly in section, showing the structure of set screws which are used to apply a large force at pre-determined points on the outer surface of the bearing race;

FIG. 5 is a side view of the system of FIG. 3;

FIG. 6 is an end view of the system of FIG. 3; and,

FIG. 7 is a side view of a modified system.

FIG. 1 is a schematic view illustrating what may happen when a fractured race is produced with two halves which are mis-matched. As shown in the figure, the bearing consists of two halves, 10 and 12. The rollers 14, only some of which are shown, will bump against the ridges 16 on the inner surface of the mis-matched race. The ridges are exaggerated for purposes of illustration. As the rollers 14 hit ridges 16 there occurs a "whistling" noise and the bearing race is considered defective.

I have found that a fracture can be made which is very controlled and will result in a fractured race with parts well matched thus eliminating "whistling". The fracture in a stressed piece will tend to propagate toward a point of higher local stress. Even though the fracture might start at a weakening notch, it will go directly to a point of high local stress caused by the pressure of a pressure applying member applied to the outer surface of the race. Using this knowledge, I developed pressure techniques which enable me to control the direction and the position of the fracture in such a way to provide interlocking interfaces which match together easily and prevent a mis-match ridge such as the ridge 16 shown in FIG. 1.

An embodiment of my new fractured race bearing is illustrated in FIG. 2. The bearing race 18 has a circumferential groove 20 in which is positioned a split ring 22. The split ring is dimensioned to fit within the groove to maintain the sections of the race in axial alignment and in mating contact after the fracture.

The fracture 24 extends from a pre-determined circumferential position on one longitudinal end of the bearing race, follows a pre-determined path, and ends at a pre-determined circumferential position on the other end of the bearing race which may correspond to its starting pre-determined circumferential position. Note that the approximate longitudinal center of the fracture 24 is circumferentially spaced from the position of the fracture at its longitudinal ends; thus, forming a substantially U-shaped fracture. Two small notches 26, 28 may be formed on one end of the bearing race 18 to prepare it for fracturing. It was found that weakening holes through the race can be completely eliminated as well as notches on the other end of the bearing race. In some cases, even the notches 26, 28 can be eliminated.

As shown in FIGS. 3 through 6 my system for fracturing a unitary race member comprises means for holding and supporting the base member indicated generally by the numeral 30. The holding and supporting means includes a pair of spaced apart support blocks 32 and 34 which support the end of an arbor 36 having a flat top 38. The outer race 18 to be fractured is placed on the arbor with the flat portion of the arbor located adjacent the notch 26 where the fracture is to be made.

A lever arm 40 is pivotally connected at one end to pivot support 41 by ball pivot 42 biased by coil spring 43. A reciprocal ram 44 applies a large force to the other end of the lever 40. Overtravel of the lever 40 is prevented by the stop 46 mounted on stop support 48.

In the embodiments shown in FIGS. 3 through 6, the plurality of longitudinally spaced apart pressure applying members consist of three set screws 50, 52, and 54. All three set screws are adjustable and are mounted in the set screw support 56 which in turn is positioned at approximately the longitudinal center of the lever 40.

As shown in FIG. 4, each set screw is especially constructed for use in practicing my new fracturing method. Each set screw includes a substantially semispherical member 58 which is pivotally connected to the lower end of the threaded portion by means such as a rubber compound 60. The flat side 62 of the semispherical member is positioned to contact and adjust to the curvature of the outer surface of the race. The flat surface provides enough contact area to avoid marking the bearing race.

Note that the circumferential location of the set screws 50 and 52 correspond to the circumferential location of the notch 26. However, the screw 54 applies pressure on the outer surface of the race at a circumferential location which is different from the circumferential location of not 26, screw 50 and screw 52. It has been found that a circumferential spacing of screw 54 from screw 50 and 52 ranging 1° to 10° is preferable. The forward position of the center pressure point is limited by the size of the curvature of the race 18. If the center pressure point is positioned too far ahead of the other two points, a "shelfing" condition occur in which the fracture angles back sharply from under the center point leaving a sharp thin projection at the outer diameter. This is undesirable and I have determined that separation between the pressure points ranging from 1° to 10° on the outer surface of the race will provide a fracture with good angularity without "shelfing".

Referring particularly to FIG. 6, it can be seen that the flat parts of the semi-spherical members on set screw 50 and 52 extend over the corresponding longitudinal edges of the race 18. This is done to concentrate the pressure at the edge of the race and insure that the fracture will initiate at the notch.

In the embodiment of FIG. 7 a second lever arm 64 on which is mounted a set screw support 66 is spaced from the first lever arm 40. Three set screws (two of which can be seen in FIG. 7) are mounted on the set screw support.

A supporting arbor 68 having two flat portions 70 and 72 is used to support the race 18 to be fractured. The arcuate restraining members 74 and 76 are used to restrain the bearing 18 during the second fracture. If the restraining members are not used, the risk of a permanent set or out-of-roundness that cannot be easily put back in-round again can be expected.

Lever arms 40 and 64 are pivotally mounted on ball pivots 78 and 80, respectively. The reciprocal ram 82 applies pressure against the lever arm 64. The stop 84 prevents over-travel of lever arm 64. The lever arms 40 and 64 are biased by springs 85 and 86.

In the operation of the embodiment of FIGS. 2 through 6, the center pressure screw 54 is adjusted downward to make first contact with the bearing race 18. Thus, when the other two pressure screw 50 and 52 bear on the outer surface of the race, the center point is already being stressed.

As the outer two pressure screws are made to bear down on the race, their pressure is equalized by the pivoted action of the lever 40 which carries the three screws. Thus, the outer two pressure screws apply equal pressure on the race while the center point is stressing an area near the center of the race and ahead of the other two points.

The notch 26 at the edge of the race 18 was previously aligned with the pressure screw 50. Thus, the fracture starts at this weakened area, proceeds to the next stress area under the pressure screw 54 and then to the remaining stress area under the pressure screw 52. In this manner a chevron or U-shaped fracture is accurately and consistently produced.

The new system shown in FIG. 7 is used to duplicate the operation on the opposite side of the race. In the embodiment of FIG. 7, the lever 40 may be first pressed by the movable ram 44 to perform the desired fracture on the top side of the race 18 (looking at FIG. 7). Then the lever 64 is operated by movable ram 82 to fracture the underside of the race 18 (looking at FIG. 7); thus, forming a fractured bearing race consisting of two substantially equal halves.

I claim:

1. A bearing race comprising at least two sections having mating surfaces formed by fracturing the bearing by applying a concentrated force at each of a plurality of longitudinally spaced apart points on the bearing race, said race having a circumferential groove and a split ring dimensioned so as to fit within said groove for maintaining the sections of the race in axial alignment and in mating contact.

2. The bearing race of claim 1 wherein the longitudinally spaced apart points consist of three points.

3. The bearing race of claim 1 wherein the fracture is a continuous longitudinal fracture extending from a predetermined circumferential position on one end of the bearing race following a path determined by the spaced apart points, and ending at a predetermined circumferential position on the other end of the bearing race.

4. A bearing race in accordance with claim 1 wherein the fracture is approximately U-shaped.

5. A bearing race in accordance with claim 4 wherein the apex of the U-shaped fracture is circumferentially spaced from the edges of the fracture from 1° to 10°.

6. A bearing race in accordance with claim 1 wherein the fracture is continuous with no openings or breaks therein.

7. The bearing race of claim 6 wherein there is a notch on one longitudinal edge of the bearing race only and adjacent the beginning of the fracture.

8. The method of fracturing a unitary bearing race comprising the step of applying a force at a plurality of spaced longitudinal points on the outer circumference of the bearing race.

9. A method of fracturing a race in accordance with claim 8 wherein the force is applied at three longitudinally spaced points.

10. A method of fracturing a bearing race in accordance with claim 9 wherein one of said three points is located adjacent each longitudinal end of said race at corresponding circumferential positions and the third point is circumferentially spaced from the other two points.

11. A method of fracturing a bearing race in accordance with claim 10 wherein the circumferential spacing of the third point from the other points range from 1° to 10°.

12. A method of fracturing a bearing race in accordance with claim 10 wherein a notch is formed at one longitudinal edge only before the forces are applied to the outer circumference of the bearing race.

13. A method of fracturing a unitary bearing race comprising the steps of:

forming a pair of diametrically spaced notches at one longitudinal end only of the bearing race;

applying pressure on the outer surface of the bearing race at a point circumferentially spaced from one of the notches and at approximately the longitudinal mid point of said race;

then applying pressure adjacent each longitudinal end of the bearing race and on the outer surface of said race at circumferential points on the race corresponding to the location of said one notch to fracture said race;

then applying pressure on the outer surface of said race at a point circumferentially spaced from the other notch and at approximately the longitudinal mid-point of said race;

then applying pressure adjacent each longitudinal end of the bearing race and on the outer surface thereof at circumferential points corresponding to the location of said other notch to form a second fracture in the bearing race thus providing a bearing consisting of two substantially equal halves.

14. A method of fracturing a bearing race in accordance with claim 13 wherein the points located substantially at the longitudinal center of the bearing race are circumferentially spaced approximately 1° to 10° from its corresponding notch.

* * * * *